(12) United States Patent
Okawa et al.

(10) Patent No.: US 8,411,602 B2
(45) Date of Patent: Apr. 2, 2013

(54) RADIO COMMUNICATION APPARATUS

(75) Inventors: Shigeru Okawa, Kawasaki (JP); Koji Hirai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 439 days.

(21) Appl. No.: 12/342,410

(22) Filed: Dec. 23, 2008

(65) Prior Publication Data

US 2009/0274075 A1 Nov. 5, 2009

(30) Foreign Application Priority Data

May 1, 2008 (JP) ................................. 2008-119472

(51) Int. Cl.
*H04J 3/00* (2006.01)
(52) U.S. Cl. ....................................... 370/280; 370/517
(58) Field of Classification Search .......... 370/276–295, 370/516–519; 375/355–375; 455/78–87
See application file for complete search history.

(56) References Cited

U.S. PATENT DOCUMENTS

| | | | | |
|---|---|---|---|---|
| 5,761,198 A | * | 6/1998 | Kojima | 370/337 |
| 5,959,982 A | * | 9/1999 | Federkins et al. | 370/336 |
| 6,470,057 B1 | * | 10/2002 | Hui et al. | 375/294 |
| 6,487,395 B1 | * | 11/2002 | Durec et al. | 455/78 |
| 2002/0071415 A1 | * | 6/2002 | Soulabail et al. | 370/337 |
| 2004/0208142 A1 | * | 10/2004 | Saw | 370/328 |
| 2006/0035600 A1 | * | 2/2006 | Lee et al. | 455/78 |
| 2010/0097964 A1 | * | 4/2010 | Astely et al. | 370/280 |

FOREIGN PATENT DOCUMENTS

| | | |
|---|---|---|
| EP | 1065808 A2 * | 1/2001 |
| JP | 5-259956 | 10/1993 |
| JP | 8-186551 | 7/1996 |
| JP | 2004-32390 | 1/2004 |
| JP | 2005-12411 | 1/2005 |
| KR | 10-2006-0010677 | 2/2006 |

OTHER PUBLICATIONS

Korean Notice of Preliminary Rejection, dated Oct. 22, 2010, for corresponding Korean Application No. 10-2009-3425.

* cited by examiner

*Primary Examiner* — Mark Rinehart
*Assistant Examiner* — Christopher R Crompton
(74) *Attorney, Agent, or Firm* — Katten Muchin Rosenman LLP

(57) ABSTRACT

A radio communication apparatus performing time division duplex alternately switching a transmission period and a reception period by time dividing an identical frequency, includes the steps of: detecting a transmission signal to be transmitted to the antenna so as to perform radio transmission from an antenna commonly used for transmission and reception; and calculating a deviation time between the detection timing of the detected transmission signal and a preset reference timing, and for controlling switchover timing between the transmission period and the reception period based on the deviation time.

4 Claims, 8 Drawing Sheets

RADIO COMMUNICATION APPARATUS

CROSS-REFERENCE TO RELATED APPLICATIONS

This application is based upon and claims the benefit of priority of the prior Japanese Patent Application No. 2008-119472, filed on May 1, 2008 the entire contents of which are incorporated herein by reference.

FIELD

The present invention relates to a radio communication apparatus performing time division duplex (TDD) in which transmission and reception are alternately switched by time dividing the same frequency, and more particularly a technique for preventing the inflow of a transmission signal into a circuit on the reception side.

BACKGROUND

The time division duplex (TDD) in radio communication is a communication method applied to a communication standard such as WiMAX (Worldwide Interoperability for Microwave Access). By switching between transmission and reception time-by-time, full duplex communication is performed in the same frequency band, and thereby efficient use of frequency can be achieved.

FIG. 1 is a diagram illustrating an exemplary configuration of a transmission/reception switch circuit in the TDD radio communication apparatus. An antenna 14 is commonly used for transmission and reception. A circulator 9 is provided for separating a transmission signal from a reception signal. By the above circulator 9, the inflow of a signal from a transmitter unit 12 into a receiver unit 16 is prevented, and also the inflow of a reception signal from antenna 14 into transmitter unit 12 is prevented. By the function of circulator 9, the transmission signal from transmitter unit 12 is transmitted from antenna 14, and the reception signal received by antenna 14 is forwarded to receiver unit 16. A capacitor 8 is a high frequency capacitor for cutting off a direct current component. Diode 6 is provided to prevent the inflow of the transmission signal leaked from circulator 9 into receiver unit 16, and is controlled to turn on/off by means of a controller unit 20. Controller unit 20 controls a switchover between the transmission period and the reception period. Based on preset and fixed switchover timing information, controller unit 20 controls to turn on/off the output of the control signal on the reception side. Namely, in the transmission period, controller unit 20 outputs a control signal on the reception side (supplies a specific voltage), so as to turn on diode 6. As a result, the impedance of diode 6 is made to be substantially 0Ω, and thus, the inflow of the transmission signal leaked from circulator 10 into receiver unit 16 is prevented. On the other hand, in the reception period, by suspending the output of the control signal on the reception side (suspending the supply of the specific voltage), so as to turn off diode 6 and make the impedance of diode 6 infinite. Thus, the reception signal is not made to flow into diode 6, and instead, made to flow into receiver unit 16.

FIG. 2 is a diagram illustrating a switchover state of transmission and reception in a normal case. In a normal state, transmitter unit 12 outputs the transmission signal during the transmission period, while receiver unit 16 receives the reception signal during the reception period. Also, in the transmission period, controller unit 20 outputs the control signal on the reception side. In contrast, in the reception period, controller unit 20 suspends outputting the control signal on the reception side.

In Patent document 1, the official gazette of the Japanese Unexamined Patent Publication No. Hei-8-186551, in case of communication between a single master station and a plurality of substations through the TDMA (Time Division Multiple Access) method, there is disclosed a configuration that each substation outputs the transmission signal during a transmission period successively assigned to each substation. Further, the configuration described below is disclosed: each substation outputs the transmission signal only when a transmission timing signal corresponding to the transmission period is input, and in contrast, when the transmission timing signal is not input, each substation suspends transmitting the transmission signal from a transmission radio section.

[Patent document 1] the official gazette of the Japanese Unexamined Patent Publication No. Hei-8-186551.

In the TDD radio communication apparatus, it is necessary to switch between transmission and reception at high speed. When the output timing of the transmission signal deviates due to an environmental temperature change, an apparatus failure, and the like, there is a risk of the occurrence of a large communication abnormality. More specifically, when the output timing of the transmission signal is delayed from normal output timing, causing the transmission signal output continued in the next reception period subsequent to the completion of the transmission period, the transmission signal flows into receiver unit 16.

FIG. 3 is a diagram illustrating a switchover state of the transmission and the reception in an abnormal case. In the figure, there is shown an abnormal state that the transmission signal is being output in the reception period. Before the completion of the transmission signal output, a shift to a reception period is made. As a result, a portion of the transmission signal flows into receiver unit 16. Here, because the transmission signal power is extremely larger than the reception signal power, and receiver unit 16 is designed to receive a weak radio wave, there is a risk of causing damage or malfunction of circuit elements, such as am amplifier circuit (low noise amplifier, LNA), having a small tolerance of power. Further, because a portion of the transmission signal is not transmitted during the transmission period, the transmission signal power transmitted from the antenna is decreased. This disables transmission of data having integral quality to a radio space.

SUMMARY

Accordingly, the objective of the present invention in regard to a radio communication apparatus and a method for controlling to switch between transmission and reception is to avoid the inflow of a transmission signal into a receiver unit caused by deviation between a transmission signal output timing and a transmission/reception switchover timing, and also to prevent quality deterioration of the transmission signal.

A first structure of a radio communication apparatus according to the present invention, performing time division duplex alternately switching a transmission period and a reception period by time dividing an identical frequency, includes: an antenna commonly used for transmission and reception; a transmitter unit being electrically connected to the antenna and outputting a transmission signal; a receiver unit being electrically connected to the antenna and the transmitter unit, and processing a reception signal received by the antenna; a switch capable of switching between an operation for the transmission period to cut off inflow of the transmission signal to the receiver unit and an operation for the reception period to cut off inflow of the reception signal to the transmitter unit; a signal detector unit detecting the transmission signal; and a controller unit calculating a deviation time between detection timing of the transmission signal detected by the signal detector unit and a preset reference timing, and controlling switchover timing of the switch based on the deviation time.

In a second structure of a radio communication apparatus according to the first structure, when the detection timing in a first transmission period is later than the reference timing, and the deviation time exceeds a predetermined time, the controller unit delays a switchover timing from a next reception period relative to the first transmission period to the next transmission period thereto by a predetermined adjustment time.

In a third structure of a radio communication apparatus according to the second structure, the predetermined adjustment time is the deviation time or shorter.

A switchover control method of transmission and reception in a radio communication apparatus according to the present invention, performing time division duplex alternately switching a transmission period and a reception period by time dividing an identical frequency, includes the steps of: a detection step for detecting a transmission signal to be transmitted to the antenna so as to perform radio transmission from an antenna commonly used for transmission and reception; and a control step for calculating a deviation time between the detection timing of the detected transmission signal and a preset reference timing, and for controlling switchover timing between the transmission period and the reception period based on the deviation time.

It is preferable that, when the detection timing in a first transmission period comes later than the reference timing, and the deviation time exceeds a predetermined time, the control step delays a switchover timing from a next reception period relative to the first transmission period to a next transmission period thereto by a predetermined adjustment time. Additionally, it is preferable that, the predetermined adjustment time is the deviation time or shorter.

According to the present invention, because the output period of the transmission signal interrupts the reception period in excess of the transmission period, it is possible to suppress the inflow of the transmission signal into the receiver unit to a minimum, and to prevent circuit breakage in the receiver unit. Also, it is possible to suppress the occurrence of a loss of transmission in which a portion of the transmission signal is not transmitted.

Additional objects and advantages of the invention (embodiments) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

Figure 1:
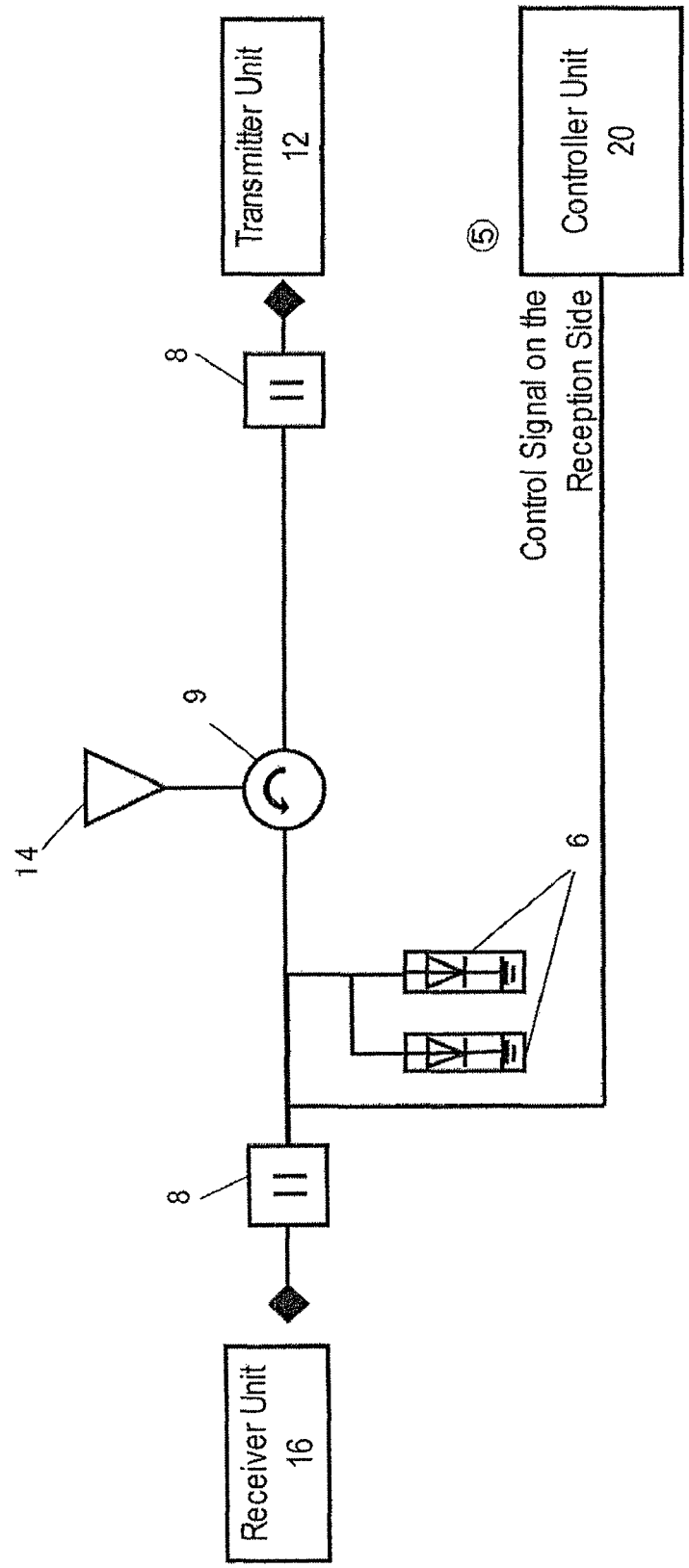
FIG. 1 is a diagram illustrating an exemplary configuration of a transmission/reception switch circuit in the TDD radio communication apparatus.
Figure 2:
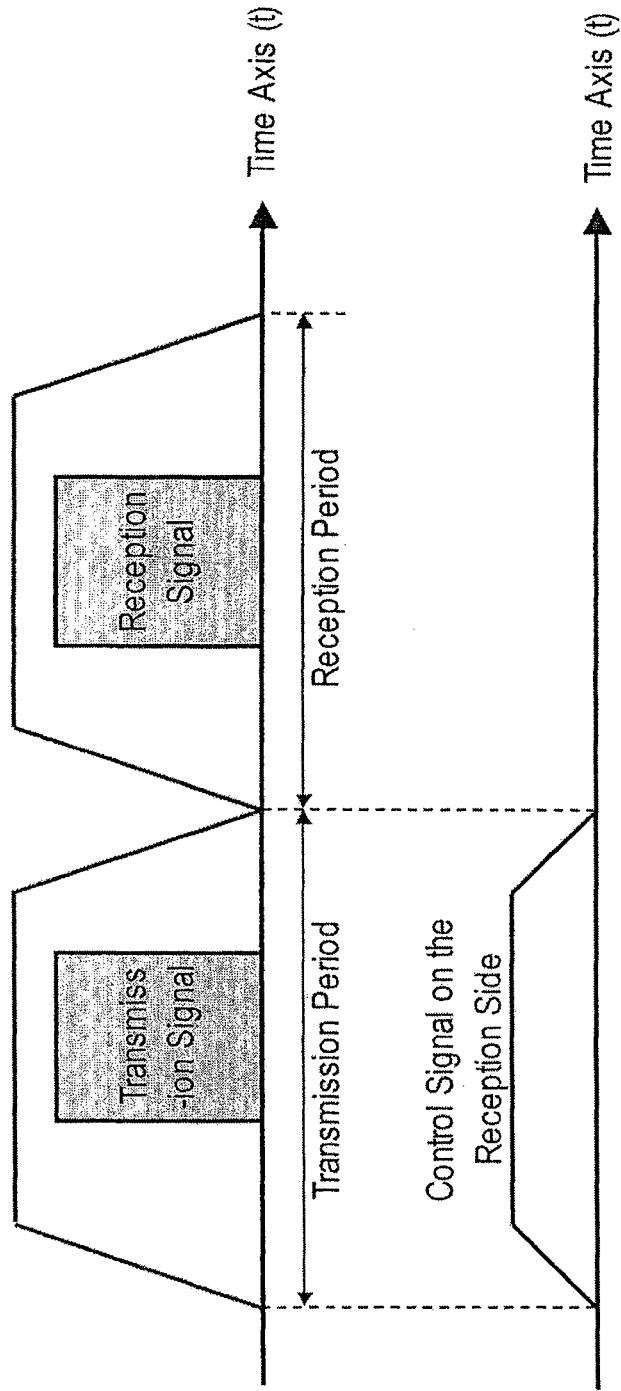
FIG. 2 is a diagram illustrating a switchover state of transmission and reception in a normal case.
Figure 3:
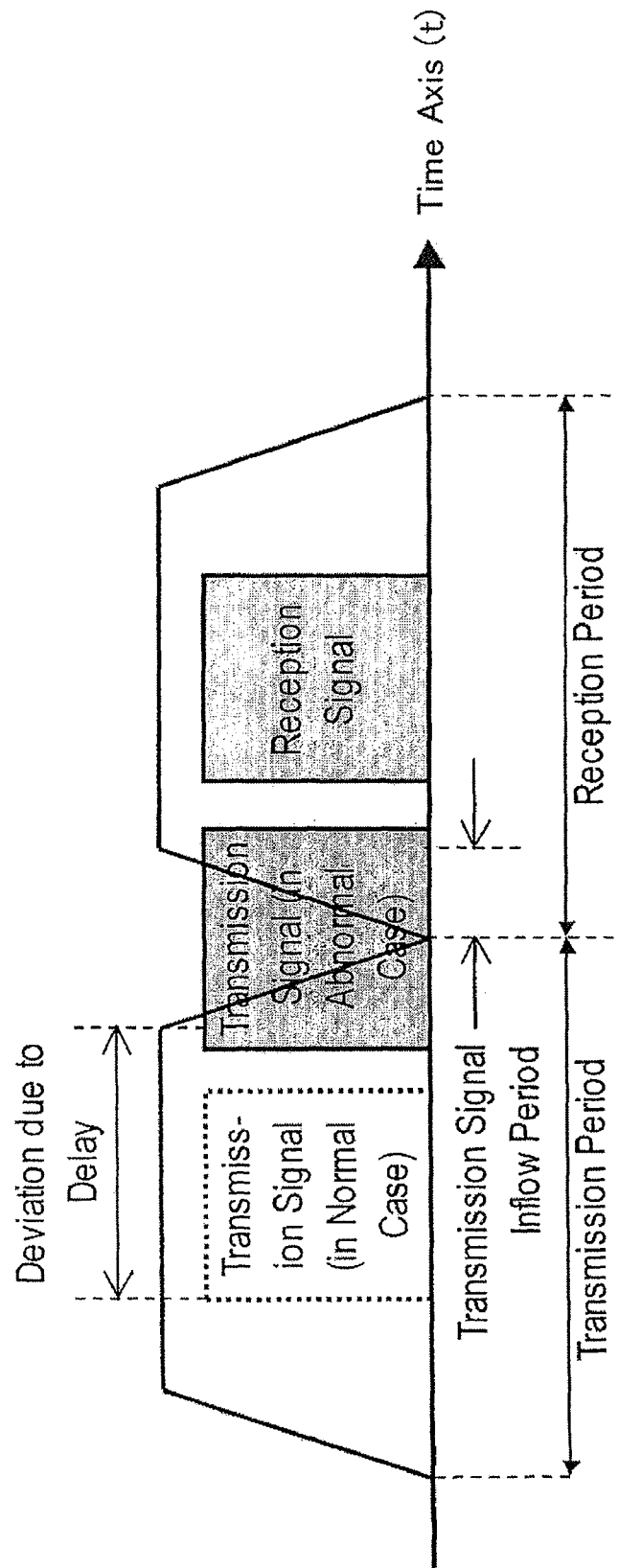
FIG. 3 is a diagram illustrating a switchover state of the transmission and the reception in an abnormal case.

The preferred embodiment of the present invention is described hereinafter referring to the charts and drawings. However, the embodiment described below is not intended to limit the technical scope of the present invention. Like reference numerals refer to like configuration elements shown in FIG. 1.

Figure 4:
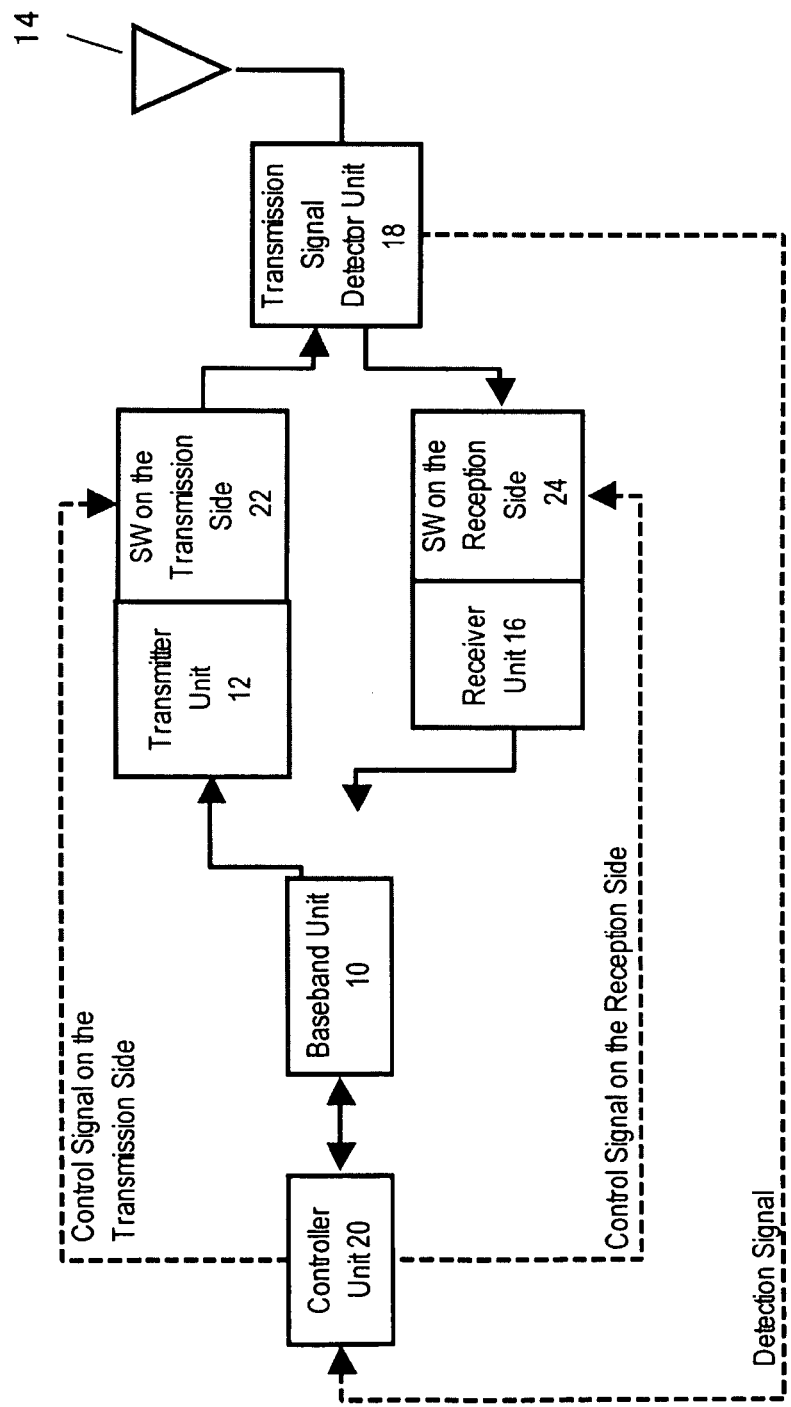
FIG. 4 is a diagram illustrating an exemplary configuration of a radio communication apparatus according to an embodiment of the present invention.

FIG. 4 is a diagram illustrating an exemplary configuration of a radio communication apparatus according to an embodiment of the present invention. A baseband unit 10 generates a transmission signal, so as to forward to a transmitter unit 12. Transmitter unit 12 transmits the transmission signal from an antenna 14. Also, a receiver unit 16 receives a reception signal from antenna 14, so as to forward to baseband unit 10. Baseband unit 10 performs demodulation processing of the reception signal.

According to the present embodiment, a transmission signal detector unit 18 is provided on a path in the vicinity of antenna 14, on which the transmission signal flows. Transmission signal detector unit 18 is configured of a detection circuit. When the transmission signal is output, transmission signal detector unit 18 outputs a detection signal which exceeds a predetermined threshold level.

A controller unit 20 performs transmission/reception switchover control. Controller unit 20 outputs a control signal on the transmission side to a switch 22 on the transmission side, and also outputs a control signal on the reception side to a switch 24 on the reception side. By switching the output timing of the above control signals, controller unit 20 switches transmission and reception.

Controller unit 20 according to the present embodiment acquires predetermined transmission/reception switchover timing information from baseband unit 10, and also corrects transmission/reception switchover timing according to the detection signal from transmission signal detector unit 18. According to the corrected transmission/reception switchover timing, controller unit 20 adjusts the output timing of both the control signal on the transmission side and the control signal on the reception side, and executes transmission/reception switchover control. More specifically, as described later, when the transmission signal is continued to output even after the completion of the transmission period (when the transmission signal output timing exceeds the transmission period), the transmission signal output is executed in the transmission period by making the next transmission period to be delayed for a specific time.

Figure 5:
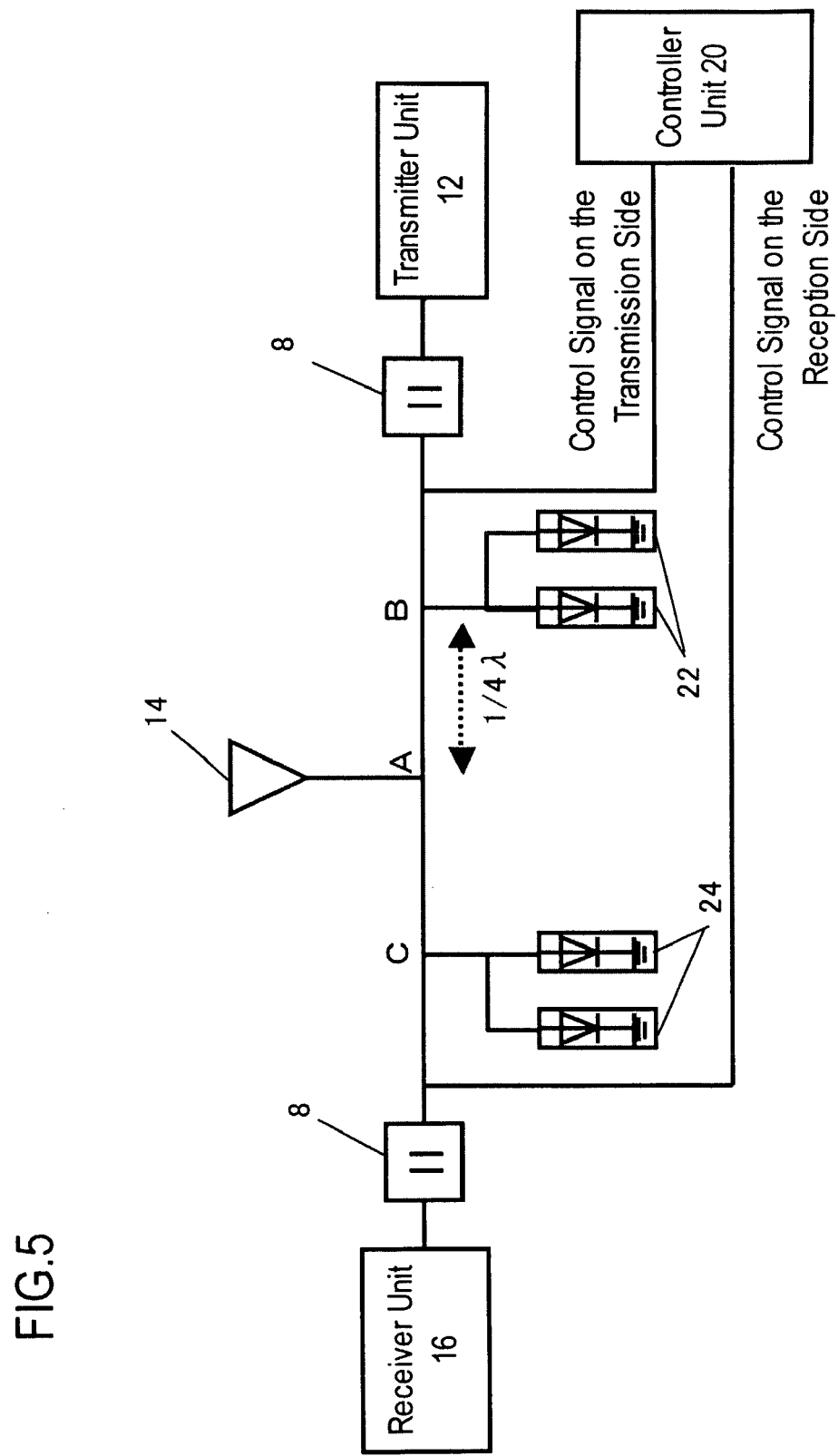
FIG. 5 is a diagram illustrating an exemplary configuration of a transmission/reception switch circuit in the radio communication apparatus according to the present embodiment.

FIG. 5 is a diagram illustrating an exemplary configuration of a transmission/reception switch circuit in the radio communication apparatus according to the present embodiment. Exemplary circuit configurations of switch 22 on the transmission side and switch 24 on the reception side are shown. Switch 22 on the transmission side and switch 24 on the reception side are formed of single-pole double-throw switches (SPDT switches), respectively configured of shunt-connected diodes. Switch 22 on the transmission side and switch 24 on the reception side are shunt connected at positions B and C, respectively, by a distance of ¼ wavelength from a branch point A, branching from antenna 14 commonly used for transmission and reception, to the transmitter unit 12 side and the receiver unit 16 side. Accordingly, the positions of the diode connections differ depending on the signal wavelength used. Although the two diodes are connected in parallel in the example of each switch 22, 24 shown in FIG. 5, each number of diodes is not limited to two, but a necessary number (1, 2, . . . n) of diodes are used according to the necessity. Additionally, a capacitor 8 is a high frequency capacitor for cutting off a direct current component.

In the transmission period, controller unit 20 outputs the control signal on the reception side, so as to turn on switch 24 on the reception side (to supply a specific voltage). Switch 22 on the transmission side is in an off state. At this time, the impedance of switch (diode) 24 on the reception side is decreased to 0Ω, and the connection point C becomes a short circuit point. Then, a point A deviating therefrom by a ¼ wavelength becomes an open circuit point (having infinite impedance). By this, there is formed a circuit in which the transmission side cannot identify the load on the reception side, and accordingly, the transmission signal flows from the branch point A to antenna 14 and, however, does not flow into the reception side.

On the other hand, in the reception period, controller unit 20 outputs the control signal on the transmission side, so as to turn on switch 22 on the transmission side (to supply a specific voltage). Switch 24 on the reception side is in an off state. At this time, the impedance of switch (diode) 22 on the transmission side is decreased to 0Ω, and the connection point B becomes a short circuit point. Then, a point A deviating therefrom by a ¼ wavelength (λ) becomes an open circuit point (having infinite impedance). By this, there is formed a circuit in which antenna 14 cannot identify the transmission side, and accordingly, the reception signal flows from antenna 14 to the reception side via the branch point A and, however, does not flow into the transmission side.

Additionally, the exemplary circuit shown in FIG. 5 is an exemplary circuit in which a circulator is not used. However, in case of using the circulator, it may also be possible to apply the configuration shown in FIG. 1.

Figure 6:
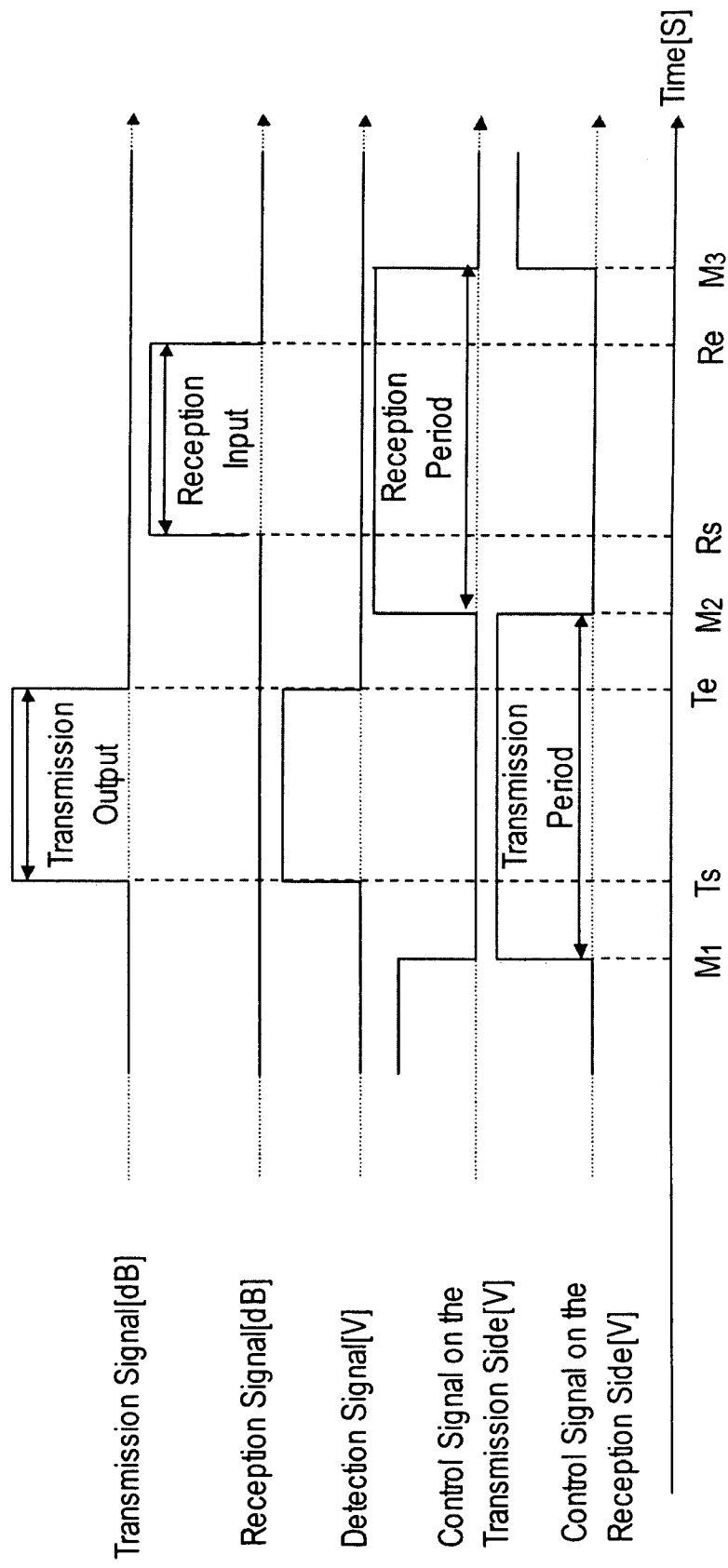
FIG. 6 is a diagram illustrating a timing chart of the transmission/reception switchover control in the normal case according to the present embodiment.

FIG. 6 is a diagram illustrating a timing chart of the transmission/reception switchover control in the normal case according to the present embodiment. Based on the information of the initial value Mn (N=1, 2, 3, . . . ) in regard to switchover timing given in advance, controller unit 20 switches on and off the control signal on the transmission side and the control signal on the reception side, on the basis of each specific period. In FIG. 6, the transmission/reception switchover timing Mn as the initial value is set in controller unit 20. Controller unit 20 first turns on the control signal on the reception side at timing M1. Then, one period thereafter, at timing M2, controller unit 20 turns off the control signal on the reception side, and at the same time, turns on the control signal on the transmission side. In other words, the duration from the timing M1 to M2 becomes a transmission period. Further, one period thereafter, at timing M3, controller unit 20 turns off the control signal on the transmission side, and at the same time, turns on the control signal on the reception side. In other words, the duration from the timing M2 to M3 becomes a reception period. The timing M3 also becomes the start timing of the next transmission period.

In the normal case, the transmission signal is output between a timing Ts and a timing Te, included in the transmission period (M1 to M2), and the reception signal is received between a timing Rs and a timing Re, included in the reception period (M2 to M3). The output start timing Ts of the transmission signal, the output end timing Te of the transmission signal, the reception start timing Rs of the reception signal, and the reception end timing Re of the reception signal are given in advance to controller unit 20, as reference timings. The transmission period (M1 to M2) and the reception period (M2 to M3) are set longer than the transmission signal output period (Ts to Te) and the reception signal reception period (Rs to Re), respectively. The reason is that, even in case that the timings of the transmission signal output period (Ts to Te) and the reception signal reception period (Rs to Re) deviate to some extent, it is configured that the transmission signal output period and the reception signal reception period are fallen within the transmission period (M1 to M2) and the reception period (M2 to M3), respectively.

Figure 7:
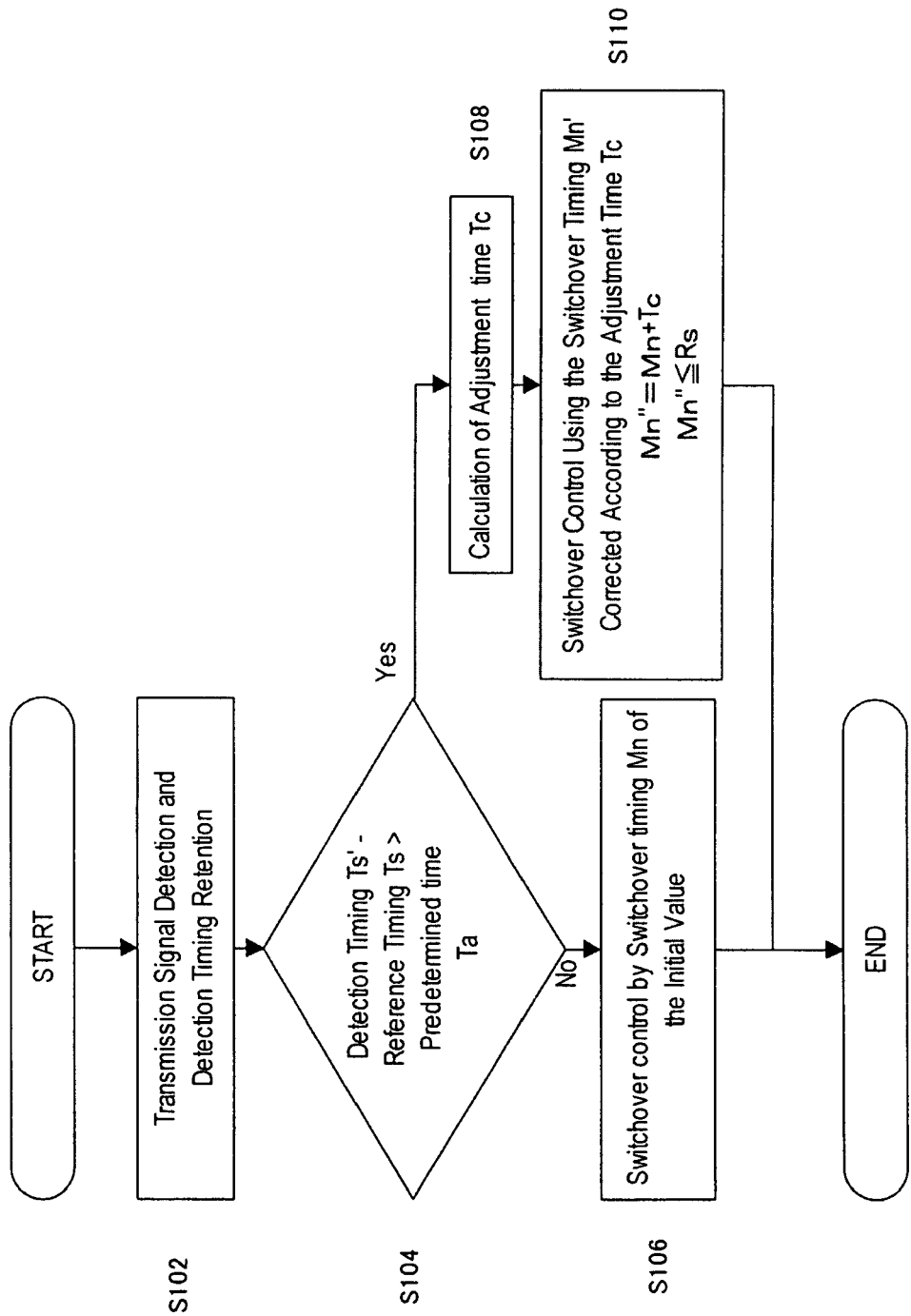
FIG. 7 is a flowchart of switchover control in controller unit 20, according to the present embodiment.

FIG. 7 is a flowchart of switchover control in controller unit 20, according to the present embodiment. Controller unit 20 switches on and off the control signal on the transmission side and the control signal on the reception side, based on the initial value Mn of the transmission/reception switchover timing which is given in advance.

Controller unit 20 receives a detection signal from transmission signal detector unit 18. When the level of the detection signal is a threshold level or greater, controller unit 20 decides that the transmission signal is being output, and retains the detection timing detecting that the signal level is the threshold level or greater (the transmission signal is transmitted) (S102).

Controller unit 20 calculates a deviation time Td (Ts'−Ts), which is a deviation time between the reference timing Ts of the transmission signal output start timing in the transmission period and a timing Ts' (actual transmission signal output start timing) being retained in step S102, so as to decide whether the deviation time Td exceeds a predetermined time Ta (S104). The deviation time Td is a delay time when the timing Ts' has a delay relative to the reference timing Ts.

The predetermined time Ta is set, for example, to be Ta=M2−Te, that is, a time from the transmission signal output end timing Te to the transmission period end timing M2. If the above deviation time Td exceeds the predetermined time Ta, the transmission signal output period exceeds the transmission period, and overflows to the reception period. As to the predetermined time Ta, it is not limited to the time (M2−Te). An appropriate time is settable by taking into consideration the rise times of the transmission period and the reception period, etc.

When the deviation time Td is the predetermined time Ta or less, the on/off control of the control signal on the reception side and the control signal on the transmission side is performed, based on the transmission/reception switchover timing Mn being set as the initial value (S106). The control to be performed when the deviation time Td is the predetermined time Ta or less is the same as the transmission/reception switchover control in a normal case shown in FIG. 6.

On the other hand, when the deviation time Td exceeds the predetermined time Ta, controller unit 20 calculates an adjustment time Tc based on the deviation time Td (S108), and corrects the switchover timing as the initial value to a switchover timing Mn' based on the adjustment time Tc. Controller unit 20 then performs switchover control using the corrected switchover timing Mn' as the start timing of the next transmission period (S110). The adjustment time Tc is given by Tc=Td−Ta. More specifically, the start timing Mn' of the next transmission period to the transmission period having detected the deviation time Td (namely, the end timing of the next reception period) is made to be Mn'=Mn+Tc. In other words, controller unit 20 delays the next transmission period start timing by the amount of the predetermined adjustment time (Td−Ta). Here, the adjustment time Tc is not limited to be (Td−Ta), but to be an appropriate time equal to the deviation time Td or smaller, taking the apparatus characteristic etc. into consideration. Additionally, the delayed switchover timing Mn' has a limitation of not exceeding the reception start timing Rs of the reception signal. The reason is to prevent the overlap of signal transmission and reception.

Figure 8:
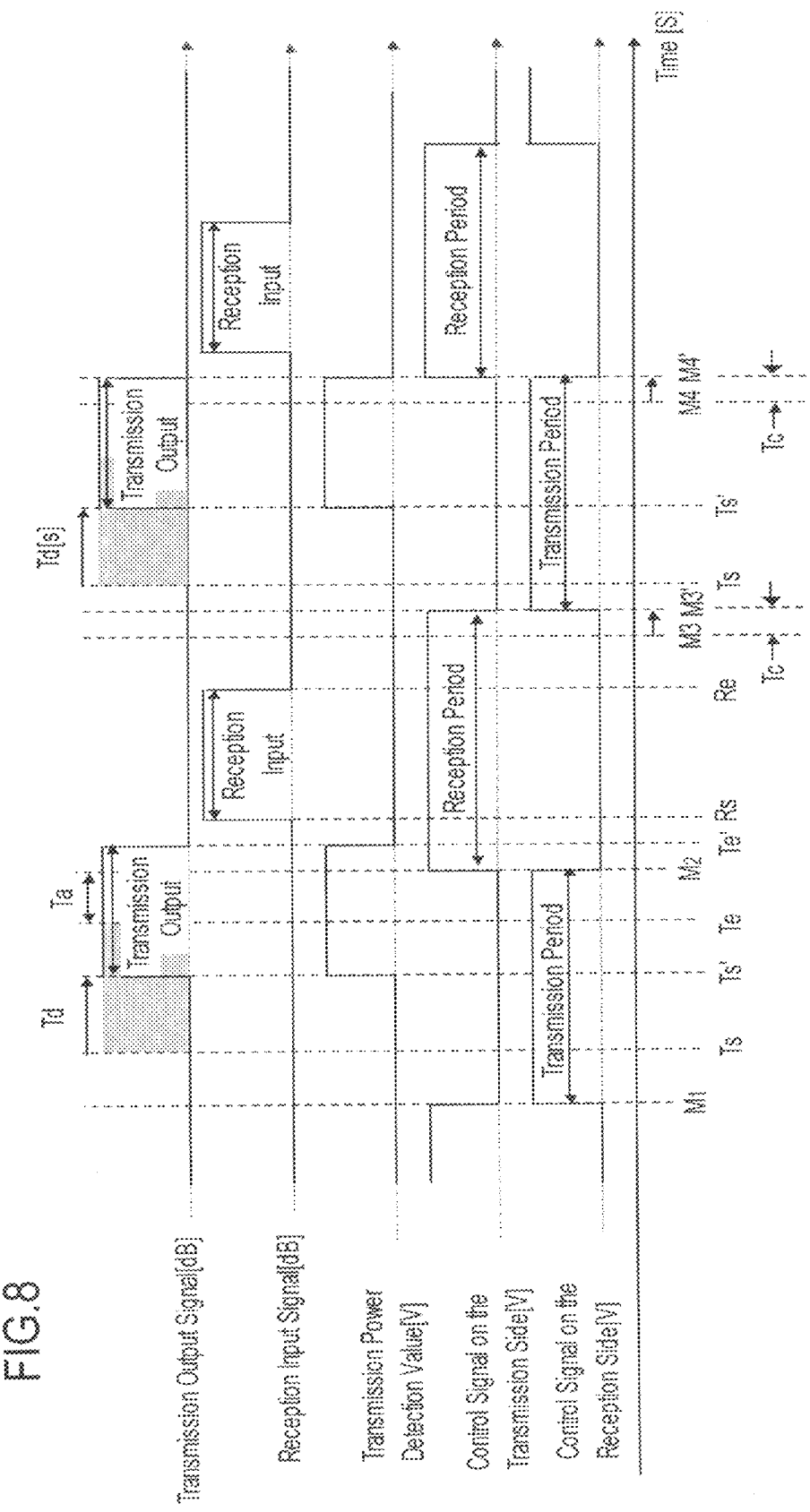
FIG. 8 is a diagram illustrating a timing chart of transmission/reception switchover control in an abnormal case according to the present embodiment.

FIG. 8 is a diagram illustrating a timing chart of transmission/reception switchover control in an abnormal case (when the deviation time Td exceeds the predetermined time Ta), according to the present embodiment. In the transmission period (M1 to M2), it is detected that the deviation time Td between the actual transmission signal output start timing Ts' and the reference timing Ts exceeds the predetermined time Ta. If the predetermined time Ta is set to be the time from the reference timing Te of the transmission signal output end timing to the initial value M2 of the transmission period end timing, then, the transmission signal output is continued by a time (Td−Ta) exceeded from the transmission period end timing M2. Controller unit 20 sets the start timing M3' of the next transmission period to be [the initial value M3+the adjustment time (Td−Ta)]. By this, in case the transmission signal output timing is the same as immediately before, the next transmission signal output period falls within the transmission period, and does not overflow to the reception period. Because the transmission signal output timing does not greatly vary period-by-period, after the deviation is detected, the deviation can be absorbed by adjusting the next transmission period based on the deviation of the transmission signal output timing in the transmission period immediately before. Accordingly, it is possible to prevent the transmission signal from being output in an overflowed manner to the reception period.

Thus, it is possible to suppress to the minimum the inflow of the transmission signal into the receiver unit caused by the transmission signal output in an overflowed manner to the reception period, and to prevent a circuit breakage of the receiver unit. Further, because the entire transmission signals are transmitted in the transmission period, it is possible to suppress the occurrence of a transmission loss caused by a failure in the transmission of a portion of the transmission signal.

In the example described above, there has been shown an example that the output deviation time Td of the transmission signal is compared with the predetermined time Ta, and thereby the switchover timing is delayed by the amount of (Td−Ta). However, it is also possible to control to delay by the deviation time Td intact, as the adjustment time, when the deviation time Td is detected. By directly reflecting the deviation time Td to the correction of the switchover timing, it is possible to maintain the transmission signal output period in the transmission period to be constant, and more stable transmission can be secured.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication apparatus performing time division duplex alternately switching a transmission period and a reception period by time dividing an identical frequency, the radio communication apparatus comprising:
   an antenna commonly used for transmission and reception;
   a transmitter unit that is coupled to the antenna and outputting a transmission signal;
   a receiver unit that is coupled to the antenna and the transmitter unit, and processing a reception signal received by the antenna;
   a switch capable of switching between an operation for the transmission period to cut off inflow of the transmission signal to the receiver unit and an operation for the reception period to cut off inflow of the reception signal to the transmitter unit;
   a signal detector unit that detects the transmission signal; and
   a controller unit that calculates a deviation time for a detection timing at which the transmission signal is detected by the signal detector unit from a preset fixed periodic timing, and controlling switchover timing of the switch based on the deviation time,
   wherein, when the detection timing in a first transmission period is later than the preset fixed periodic timing, and the deviation exceeds a predetermined time, the controller unit delays a switchover timing from a next reception period relative to the first transmission period to the next transmission period thereto by a predetermined adjustment time.

2. The radio communication apparatus according to claim 1, wherein the predetermined adjustment time is the deviation time or shorter.

3. A switchover control method of transmission and reception in a radio communication apparatus, performing time division duplex alternately switching a transmission period and a reception period by time dividing an identical frequency, the switching control method comprising:
   detecting a transmission signal to be transmitted to the antenna so as to perform radio transmission from an antenna commonly used for transmission and reception;
   calculating a deviation time for a detection timing at which the transmission signal is detected from a preset fixed periodic timing;
   controlling switchover timing between the transmission period and the reception period based on the deviation time; and
   delaying, when the detection timing in a first transmission period comes later than the preset fixed periodic timing, and the deviation time exceeds a predetermined time, a switchover tuning from a next reception period relative to the first transmission period to a next transmission period thereto by a predetermined adjustment time.

4. The switchover control method according to claim 3, wherein the predetermined adjustment time is the deviation time or shorter.

* * * * *